(12) United States Patent (10) Patent No.: US 9,228,164 B1
Uhlik et al. (45) Date of Patent: Jan. 5, 2016

(54) ALCOHOL LOUCHING RECEPTACLE

(71) Applicants: Dimitri Uhlik, Scottsdale, AZ (US); Michael Uhlik, Scottsdale, AZ (US)

(72) Inventors: Dimitri Uhlik, Scottsdale, AZ (US); Michael Uhlik, Scottsdale, AZ (US)

( * ) Notice: Subject to any disclaimer, the term of this patent is extended or adjusted under 35 U.S.C. 154(b) by 0 days.

(21) Appl. No.: 14/686,638

(22) Filed: Apr. 14, 2015

Related U.S. Application Data

(63) Continuation-in-part of application No. 11/877,169, filed on Oct. 23, 2007.

(51) Int. Cl.
  *C12G 1/02* (2006.01)
  *C12G 3/06* (2006.01)

(52) U.S. Cl.
  CPC ....................................... *C12G 3/06* (2013.01)

(58) Field of Classification Search
  CPC ............ A47G 19/2205; A47G 19/2266; A47G 2019/122; A47G 21/18; B01F 3/08; B65D 81/3283; B65D 81/3288; C12G 1/00–1/08; C12G 2200/00–2200/31; C12G 3/06; C12M 41/32
  USPC ........ 99/275, 277, 277.1, 277.2; 141/58, 363, 141/364; 206/427, 430; 215/6, 43, 376, 215/398; 220/23.83, 501, 503, 527, 554, 220/555, 675, 703, 705, 710, 710.5, 713; 222/133, 136, 145.5, 420, 421
  See application file for complete search history.

(56) References Cited

U.S. PATENT DOCUMENTS

| | | | |
|---|---|---|---|
| 2,501,905 | A | 3/1950 | Leathers |
| 2,779,472 | A | 1/1957 | Febbraro |
| 4,738,355 | A | 4/1988 | Jobe |
| D418,015 | S | 12/1999 | Santini |
| 6,227,004 | B1 | 5/2001 | Gerstein |
| 6,527,137 | B1 * | 3/2003 | Kleckauskas et al. ........ 220/705 |
| D473,753 | S | 4/2003 | Hanson |
| 2005/0274137 | A1 | 12/2005 | Beaudry |
| 2007/0119727 | A1 | 5/2007 | Cho |

FOREIGN PATENT DOCUMENTS

CA     1113413 A     12/1981

OTHER PUBLICATIONS http://www.absintheonline.com/acatalog/Glassware.html; absintheonline webpage from Jun. 3, 2005.*

* cited by examiner

*Primary Examiner* — Dana Ross
*Assistant Examiner* — Brandon Harvey
(74) *Attorney, Agent, or Firm* — Booth Udall Fuller, PLC

(57) ABSTRACT

A beverage receptacle for louching alcohol. Particular implementations include a beverage receptacle with a first reservoir and a second reservoir coupled by a communication channel with a minimum diameter sufficient to cause dripping. Beverage receptacle dimensions and features may vary. Communication channel may comprise any of a plurality of shapes and sizes and may even comprise a controllable valve. Mixed beverage may be served directly from the beverage receptacle or in a separate glass.

19 Claims, 7 Drawing Sheets

ALCOHOL LOUCHING RECEPTACLE

CROSS REFERENCE TO RELATED APPLICATIONS

This application is a continuation-in-part application of the earlier U.S. patent application to Uhlik entitled "BEVERAGE RECEPTACLE," application Ser. No. 11/877,169, filed Oct. 23, 2007, now pending, the disclosure of which is hereby incorporated by reference.

BACKGROUND

1. Technical Field

This document generally relates to beverage receptacles and more specifically to a device and associated methods to louche liquids within a beverage receptacle.

2. Background Art

Certain social beverages are best served after combining two liquids at a slow rate. One such beverage that is most common in European countries is absinthe, which is a form of alcoholic beverage associated with the wormwood plant. Traditional preparation of absinthe as a social beverage involves pouring absinthe into a glass and placing a slotted spoon holding a sugar cube over the glass. Ice water is then dripped or slowly poured over the sugar cube and into the absinthe below in order to dilute the beverage according to taste. The process of dripping the ice water into the absinthe is generally believed to release certain flavors from within the alcohol. The process also creates a milky opalescence in the absinthe; the creation of the milky look within a drink is commonly called "louching."

Traditional louching of a social drink, particularly for drinks such as absinthe, can be challenging in social settings because the preparation requires the slotted spoon and a pouring pitcher or fountain for the ice water, and the process can be difficult to complete properly for those without experience in dripping the ice water over the sugar cube at a slow enough rate for proper louching. There is a need, therefore, for a beverage receptacle that can be used to prepare and serve a louching social beverage, such as absinthe, without the need to manually control the dripping flow rate of ice water over a slotted spoon.

SUMMARY

In one aspect, the invention features a beverage receptacle for louching alcohol. The beverage receptacle includes a first reservoir, a second reservoir, and a communication channel. The first reservoir includes a first opening and a second opening. The second reservoir includes a volume of at least about 45 milliliters, and a first opening and a second opening. A communication channel is provided between the second opening of the first reservoir and the first opening of the second reservoir. The communication channel includes a minimum diameter of between about 5.0 millimeters and about 13 millimeters. Other communication channels may comprise a plurality of minimum diameters less than 5.0 millimeters.

In another aspect, the invention features a method for louching alcohol. The method includes placing the social beverage in the second reservoir, placing cold water into the first reservoir which is coupled to the second reservoir and louching the social beverage in the second reservoir by dripping the cold water from the first reservoir through the communication channel and into the social beverage.

Particular implementations of the method for louching alcohol may include placing ice in the first reservoir, restricting the cold water from dripping into the social beverage in the second reservoir by placing ice at the top-side opening to the communication channel, and/or placing a sweetener into the first reservoir prior to or after placing the cold water into the first reservoir. Other implementations may include pouring the social beverage that has been louched from the second reservoir into a drinking glass by turning a faucet on a side of the second reservoir, or serving the louched social beverage in the second reservoir through a sipping pipe that has a hollow inside diameter and is coupled to the second reservoir.

Particular implementations of the beverage receptacle may also include one or more other features. For example, the beverage receptacle may include a sipping pipe with a hollow inside diameter coupled to the second opening of the second reservoir and extending vertically from the second reservoir to a point vertically above the first reservoir. Alternately, the beverage receptacle may include a faucet coupled to the second opening of the second reservoir.

Figure 6:
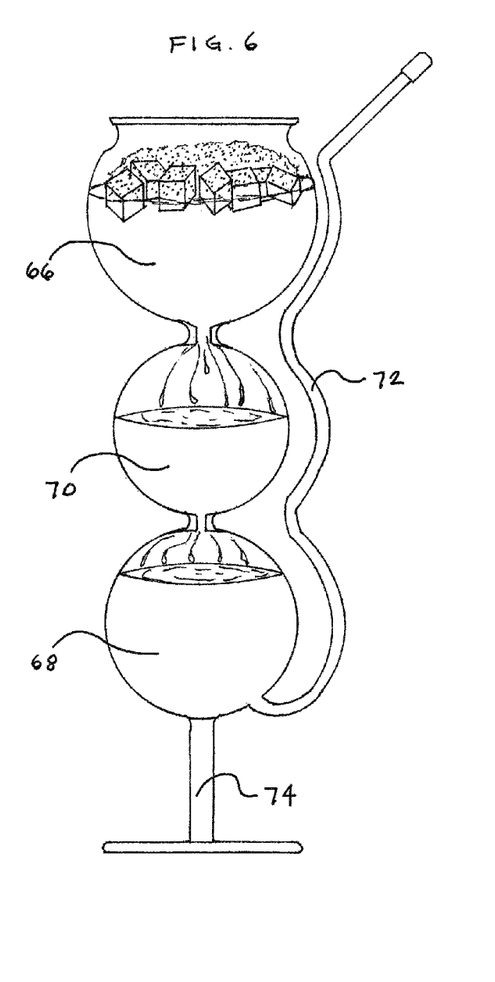
FIG. 6 is a perspective view of a fourth implementation of a beverage receptacle.
Figure 7:
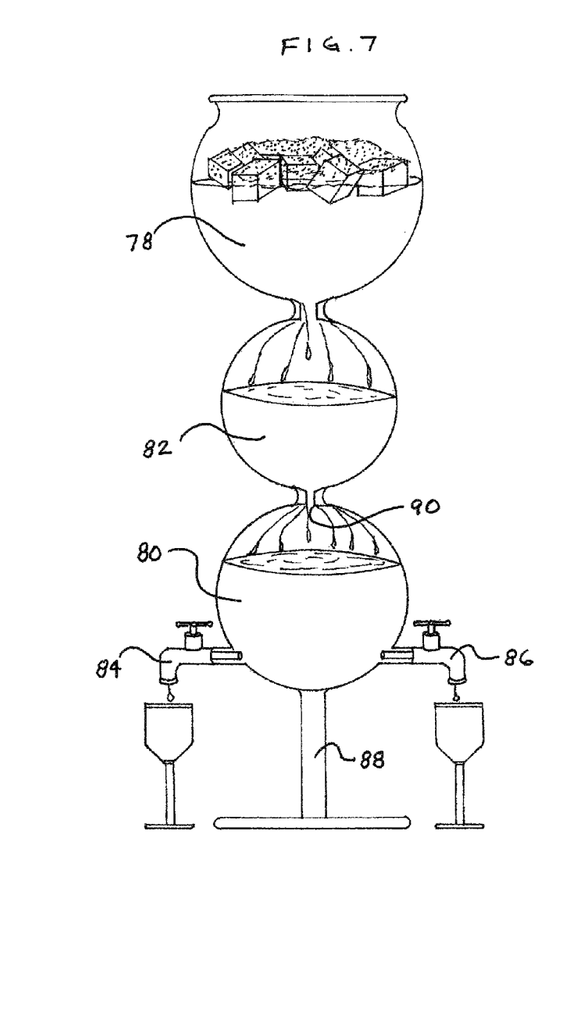
FIG. 7 is a perspective view of a fifth implementation of a beverage receptacle.

Other particular implementations of a beverage receptacle may include a first opening of a first reservoir (e.g., opening 22 in FIG. 1) with a diameter of at least about 25 millimeters. One particular implementation comprises a communication channel with a minimum diameter of between at least about 5.0 millimeters and about 7.5 millimeters. A communication channel may comprise a constant diameter between a second opening of a first reservoir and a first opening of a second reservoir. Alternatively, a communication channel may comprise a variable diameter and even a bulbous shape as illustrated in FIGS. 6 and 7. If a communication channel has a variable diameter, at least a portion of the communication channel comprises a minimum diameter of between at least about 5.0 millimeters and about 13 millimeters or of at least about 5.0 millimeters and about 7.5 millimeters in particular implementations. In still more particular implementations, the minimum diameter feature is defined by a first opening of a second reservoir at the bottom of a communication channel.

Other particular implementations of the beverage receptacle may further include a base section with a first end and a second end where the base section is coupled to the second reservoir at the first end and has a flat surface at the second end.

Additional implementations of a beverage receptacle may comprise where at least one of a first reservoir, a second reservoir, and/or a communication channel are made of blown, shaped glass. The blown, shaped glass may be clear or have a colored pattern. Alternately, at least one of a first reservoir, a second reservoir, and/or a communication channel may be made of a plastic material, and the plastic material may be clear or have a colored pattern. For a beverage receptacle at least a portion of the first reservoir, a second reservoir and a communication channel be integrally formed as a unitary piece or as entirely separate pieces and assembled together.

By using an appropriately configured beverage receptacle according to principles disclosed herein, a single beverage receptacle may be used in place of a combination of tools commonly used to louche a social drink, such as a separate drinking glass, a slotted spoon, and a pouring receptacle. Use of a beverage receptacle may reduce the need for manually, slowly dripping water or other liquid from a pouring receptacle into a social beverage to produce the louche reaction. Using conventional methods of drink preparation, this manual louching step is even more challenging if a person wants to sweeten the social beverage by dripping water over a sugar cube balanced atop a drinking glass below.

Using a beverage receptacle configured according to particular implementations of a beverage receptacle discussed herein, a beverage preparer may be able to prepare a louched social beverage without the need to closely monitor the preparation process and without the need to even keep the social drink stationary throughout its preparation.

The general and specific aspects of the foregoing and other aspects, features, and advantages will be apparent to those artisans of ordinary skill in the art from the description, the drawings, and the claims.

BRIEF DESCRIPTION OF THE DRAWINGS

Beverage receptacles will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended beverage receptacles and/or assembly procedures for a particular beverage receptacle will become apparent for use with implementations of beverage receptacles from this disclosure. Accordingly, for example, although particular shapes, materials and dimensions are disclosed, such shapes, materials, dimensions and implementing components may comprise any shape, size, style, type, model, version, measurement, concentration, material, quantity, and/or the like as is known in the art consistent with the intended operation of a beverage receptacle.

Figure 1:
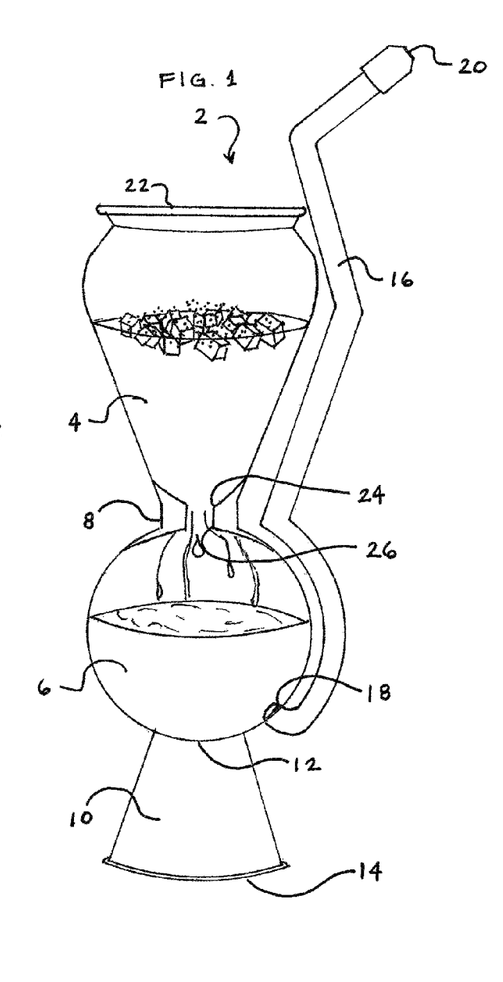
FIG. 1 is a perspective view of a first implementation of a beverage receptacle.

FIG. 1 illustrates a perspective view of a particular implementation of a beverage receptacle 2. The receptacle 2 may include a first reservoir 4 that is coupled to a second reservoir 6 and comprises a communication channel 8. In a particular implementation, the second reservoir 6 is large enough to hold at least 45 milliliters of liquid. The receptacle 2 may also include a base section 10 that is coupled to the second reservoir 6 at a first end 12 of the base section 10. The base section 10 may also include a second end 14 of the base section 10 that is essentially flat or is at least configured to rest stably on a flat surface so that the base section 10 can support the receptacle 2 on a flat, horizontal surface. The receptacle 2 may also include a sipping pipe 16 that is coupled to a second opening 18 of the second reservoir 6. The sipping pipe 16 may include a hollow inside diameter or channel and an open first end 20 through which someone may drink the beverage through the sipping pipe 16.

The sipping pipe 16 may be integral with the second reservoir 6 or may be fixedly or removably coupled to it. For example, the sipping pipe 16 may be detachably coupled to the second reservoir 6 through an airtight and watertight coupling.

In a particular implementation of a beverage receptacle, a first opening 22 in the first reservoir 4 may be configured to have a diameter of at least about 25 millimeters to facilitate addition of ice and convenient pouring of liquid into the first reservoir 4. A second opening 24 in the first reservoir 4 is coupled to a first opening 26 in the second reservoir 6 through the communication channel 8. In particular implementations, a portion of the communication channel 8 may be configured to have a minimum diameter in the range of between at least about 5.0 millimeters and about 13 millimeters. For this and other implementations of a communication channel, the minimum diameter of the communication channel may be configured to be adjustable and even closed (for example, FIG. 5).

It has been found through repeated testing on communication channels having varied minimum diameters that having a minimum diameter of approximately 5.0 to approximately 5.7 millimeters is optimal for dripping cold water from an upper reservoir into a lower reservoir. When particular alcohols, such as absinthe, are used in the lower reservoir, if the communication channel is much smaller, the cold water does not drip but is suspended by the vapor pressure within the lower reservoir. If it is much larger, the water pours rather than drips. Dripping, as used herein, comprises not only the formation and release of small droplets, but the formation and release of small amounts of liquid along the sides of the lower reservoir from the communication channel in a periodic cascading effect of the cold water into the lower chamber as ripples along the sides. A larger communication channel, up to about 7.5 millimeters, may be used if small ice (approximately 8 millimeters or larger) or sugar cub is used that partially blocks the opening of the communication channel to leave an opening with a minimum diameter so that the water drips into the lower reservoir. The communication channel may be made even larger, up to about 13 millimeters, if large ice (approximately 14 millimeters or larger) or sugar cube is used that partially blocks the opening of the communication channel so that the cold water drips into the lower reservoir.

Ice is not required for the louching process to work, but ice is often incorporated into the process. For example, ice may be added to the first reservoir 4 through the first opening 22 in the first reservoir 4 prior to adding the water. The ice may be in the form of cubes, chunks, sliced, crushed or other conceivable form. The volume of ice that may be used in the louching process is variable, but the maximum volume of ice is limited by the volume of the first reservoir 4.

Figure 2:
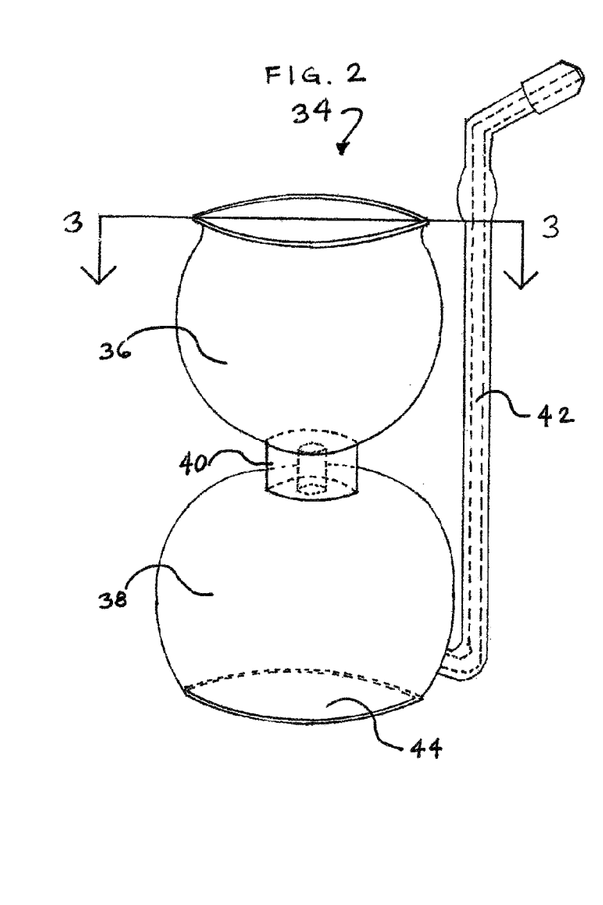
FIG. 2 is an isometric perspective view of a second implementation of a beverage receptacle.
Figure 3:
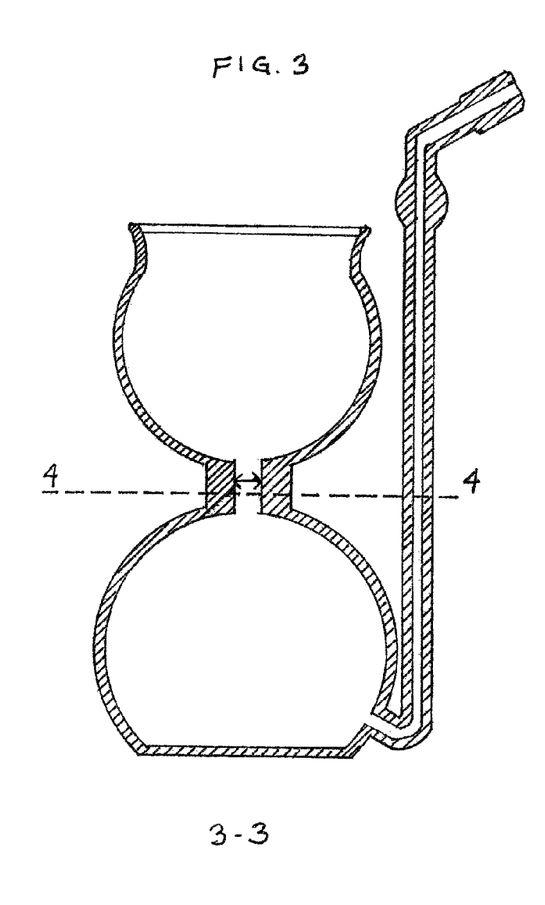
FIG. 3 is a cross-sectional front view of the second implementation of the beverage receptacle taken along section lines 3-3 of FIG. 2.
Figure 4:
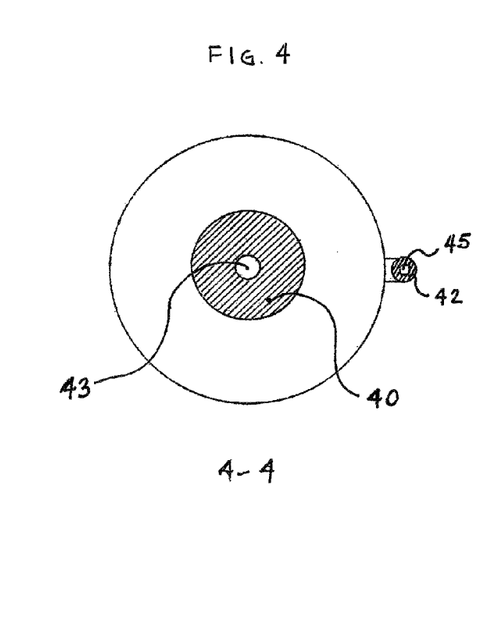
FIG. 4 is a top view of the second implementation of the beverage receptacle taken along section lines 4-4 of FIG. 3.

Referring to FIG. 2, another particular implementation of a beverage receptacle 34 is illustrated with an isometric perspective view. This particular implementation may comprise a first reservoir 36, a second reservoir 38, a communication channel 40, and a sipping pipe 42. In the particular implementation of FIG. 2, the second reservoir 38 comprises a flat-bottom surface 44 for supporting the beverage receptacle 34 on a flat, horizontal surface. The flat-bottom surface 44 may be flat and enclosed, or flat-bottom in the sense that it does not have any parts that extend beyond a flat planar extent so that the second reservoir is configured to rest stably on a flat surface. FIG. 3 further illustrates this second implementation with a cross-sectional front view taken along section lines 3-3 of FIG. 2. FIG. 4 illustrates a cross-section of the communication channel 40 of this second implementation taken along section lines 4-4 of FIG. 3. FIG. 4 shows a center opening representing a minimum diameter 43 of the communication channel 40 as described above with reference to the minimum diameter of the communication channel of FIG. 1 and may be configured the same as in that particular implementation. FIG. 4 further illustrates a cross section of the sipping pipe 42 showing a hollow inside diameter 45.

Figure 5:
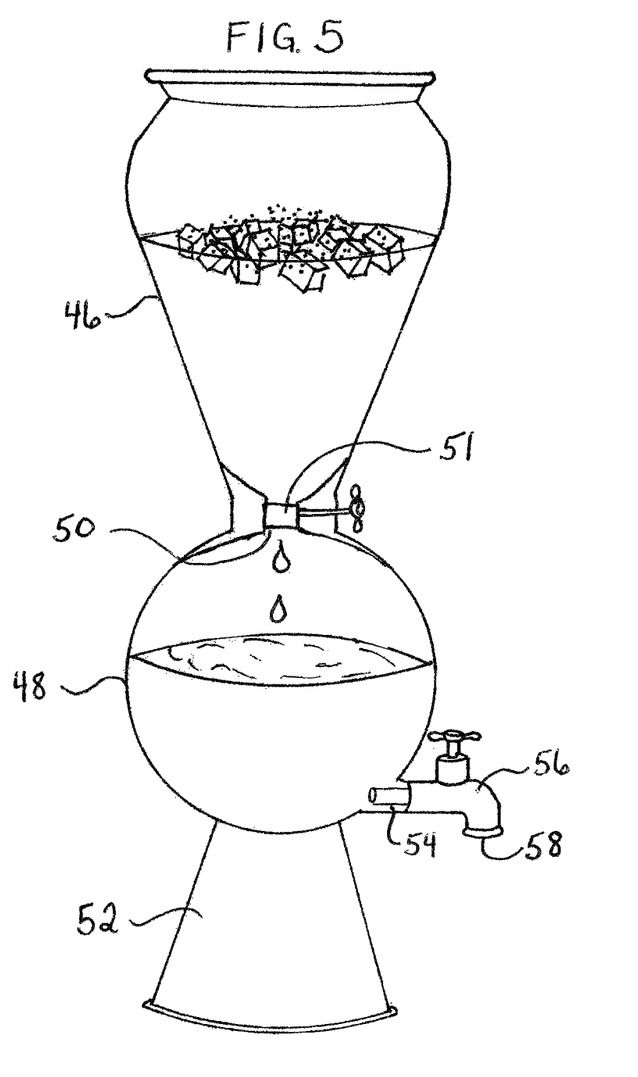
FIG. 5 is a perspective view of a third implementation of a beverage receptacle.

FIG. 5 illustrates another particular implementation of a beverage receptacle for use as a pitcher for beverages to serve to multiple people, the beverage receptacle comprising a first reservoir 46, a second reservoir 48, a communication channel 50, and a base section 52. In this particular implementation, a second opening 54 of the second reservoir is coupled to a faucet 56. The faucet 56 comprises a valve for controlling the flow of liquids from the second reservoir 48, and an open end 58 for serving a social beverage from the second reservoir 48. This particular implementation also comprises a communication channel 50 with a valve controlled drip. A valve 51 is arranged at the communication channel 50 to allow the user to selectively increase or decrease a cross-sectional dimension of the communication channel 50. In particular implementations, this cross-sectional dimension may be the minimum diameter of the communication channel 50. In other implementations, the cross-sectional dimension may be some other diameter of the communication channel 50 that is wider than the minimum diameter. The valve 51 may also be configured to completely shut off the communication channel 50 in particular implementations but still have a selectable minimum diameter within the desired drip dimension range somewhere between its wide open and closed setting. Use of a controllable valve 51 allows the user to select the desired flow speed of liquid from the first reservoir 46 to the second reservoir 48.

This valve control of the minimum diameter of the communication channel may be applied to any of the other implementations disclosed herein to implement a controlled drip. This and any other implementation disclosed herein may alternatively comprise a minimum diameter within the communication channel configured like the minimum diameter of the communication channel described with reference to the particular implementation shown in FIG. 1 or like the minimum diameter of the communication channel described with reference to the particular implementation shown in FIG. 8.

Although the first reservoir 46 and the second reservoir 48 are likely much larger with this particular implementation as compared with the particular individual serving implementation shown in FIG. 1, the communication channel 50 may still comprise a minimum diameter in the range of between at least about 5.0 millimeters and about 13 millimeters. A minimum diameter of approximately 5.0 to approximately 5.7 millimeters is optimal for dripping cold water from the upper reservoir into the lower reservoir as described in reference to the particular implementation shown in FIG. 1, but may be larger if ice is used that partially blocks the opening of the communication channel 50.

FIG. 6 illustrates another particular implementation of a beverage receptacle comprising a first reservoir 66, a second reservoir 68, a communication channel 70, a sipping pipe 72, and a base with a stem 74. In this particular implementation, the communication channel 70 comprises a variable diameter and generally a bulbous shape. The minimum diameter feature of the communication channel 70 for this particular implementation, as described above with reference to FIG. 1, is located at the juncture between the communication channel 70 and a first opening in the second reservoir 76. Although the term "minimum diameter" is used herein, it is not intended to imply that the communication channel 70 can only be rounded or have a true "diameter." The term diameter is used herein to reference the minimum cross-sectional width of the communication channel which in most cases will be rounded. However, other cross-sectional shapes for the communication channel such as, by non-limiting example, square, rectangular, triangular, hexagonal, polygonal, other unnamed shapes and the like may also be referred to as having a minimum diameter as a measure of their minimum cross-sectional width.

FIG. 7 illustrates another particular implementation of a beverage receptacle comprising a first reservoir 78, a second reservoir 80, a communication channel 82, a first side faucet 84, a second side faucet 86, and a base section 88. The communication channel 82 in this particular implementation also has a variable diameter and generally a bulbous shape. The minimum diameter feature of the communication channel 82 for this particular implementation, as described above with reference to FIG. 1, is located at the juncture between the communication channel 82 and a first opening in the second reservoir 90. Although many of the implementations illustrated herein include a minimum diameter feature for the communication channel at the juncture between the communication channel and the first opening to the second reservoir, this location is not required for a beverage receptacle to drip. The minimum diameter feature for the communication channel may be included anywhere between the first reservoir and the second reservoir to enable dripping of a liquid into the second reservoir. Adjustment in placement of the minimum diameter point, however, may affect how the dripping occurs. For example, placing the minimum diameter at the juncture between the communication channel and the first opening to the second reservoir may assist in helping droplets to form at the first opening. On the contrary, placing the minimum diameter up higher, with communication channel below the minimum diameter point may assist more in a cascading effect for the dripping.

FIG. 7 further illustrates the positioning of beverages glasses below the first side faucet 84 and the second side faucet 86. The base section 88 with this particular implementation is generally conical in shape with a bottom surface that is essentially flat or is at least configured to rest stably on a flat surface so that the base section 88 can support the beverage receptacle on a flat, horizontal surface (such as a base having one or a plurality of supports having planar extents as shown in most of the implementations shown herein). Particular implementations with base sections may comprise a minimum height of approximately 18 centimeters in order to accommodate the size of glasses typically used in serving social beverages. With a minimum base height of approximately 18 centimeters, a beverage glass may be positioned below a faucet and a louched social beverage dispensed directly into the glass.

Figure 11:
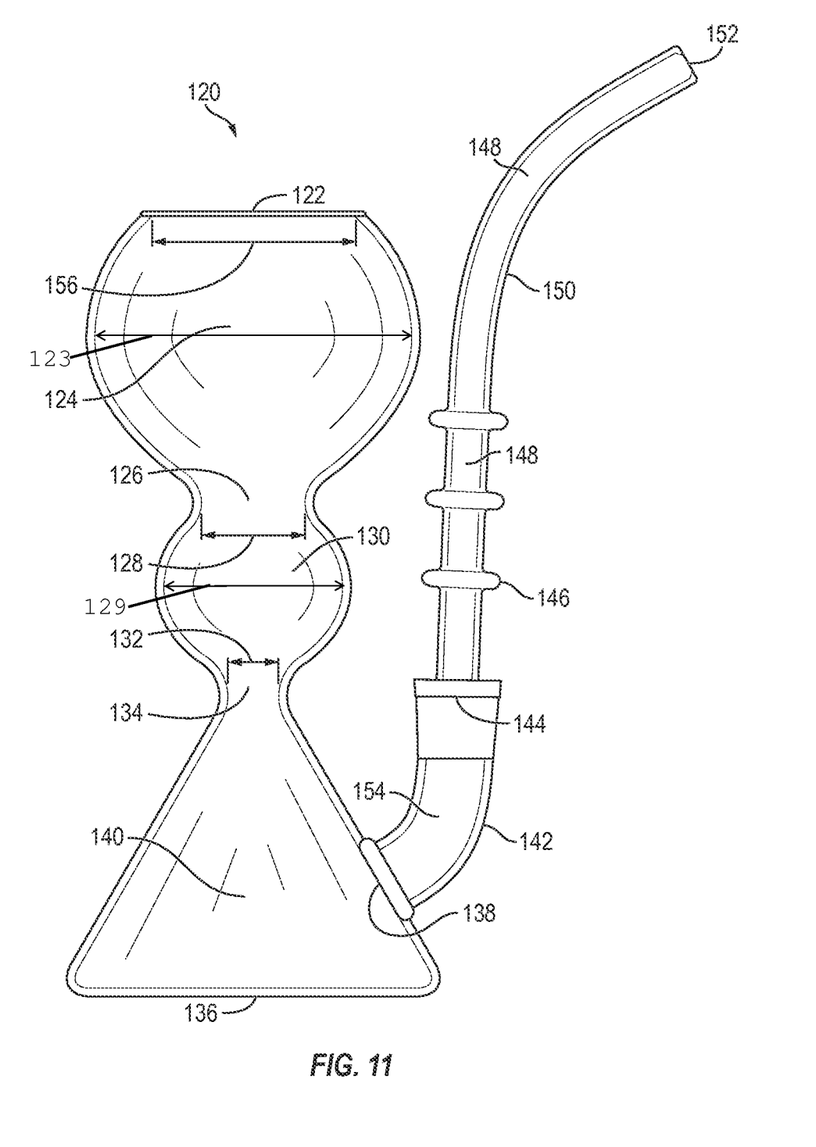
FIG. 11 is a side view of a seventh implementation of a beverage receptacle.

FIG. 11 depicts another non-limiting embodiment of a beverage receptacle 120 similar to beverage receptacles described in relation to FIGS. 6 and 7. For example, a beverage receptacle 120 may comprise a first reservoir 124, a second reservoir 140, a communication channel 130, a sipping pipe 150, and a base 136. In the particular implementation, the communication channel 130 comprises a variable diameter and generally a bulbous shape. According to some aspects, at least a portion of the communication channel 130 comprises a minimum width portion 132 located at the juncture between the communication channel 130 and a first opening 134 in the second reservoir 140. Although the term "minimum diameter" is used herein, it is not intended to imply that the communication channel 132 can only be rounded or have a true "diameter." The term diameter is used herein to reference the minimum cross-sectional width of the communication channel, which in most cases will be rounded. However, other cross-sectional shapes for the communication channel such as, by non-limiting example, square, rectangular, triangular, hexagonal, polygonal, other unnamed shapes and the like may also be referred to as having a minimum diameter as a measure of their minimum cross-sectional width. In one or more embodiments, a beverage receptacle comprises a total height of between approximately 140 millimeters and approximately 180 millimeters. More particularly, a beverage receptacle 120 may comprise a height of between approximately 150 and 170 millimeters. Even more particularly, a beverage receptacle may comprise a height of approximately 160 millimeters.

More particularly, a beverage receptacle 120 may comprise a first reservoir 124 have a first opening 122 and a second opening 126. The first opening 122 of the first section 122 may be similar to other first openings of first reservoirs described in this document, such as, but not limited to, allow a user to easily insert ice, beverage, and or sugar cubes into the beverage receptacle 120. In one or more non-limiting embodiments, the first opening 122 of the first reservoir 124 comprises a diameter or width 156 of between approximately 40 millimeters and approximately 55 millimeters. More particularly, the first opening 122 of the first reservoir 124 may comprise a diameter or width 156 of between approximately 45 millimeters and approximately 50 millimeters. According to some aspects, a first reservoir 124 has a varied width, such as but not limited to a bulbous shape. In such embodiments, the first reservoir may comprise a maximum width portion 123 positioned between the first opening 122 and the second opening 126 and comprising a width of between approximately 60 millimeters and 80 millimeters.

A second opening 126 of a first reservoir 124 may be positioned at a juncture between the communication channel 130 and the first reservoir 124. According to some aspects, the juncture between the communication channel 130 and the first reservoir 124 at the second opening 126 of the first reservoir 124 comprises a medium width portion 128 of the communication channel 130 having a diameter or width that is greater than a minimum width portion 132 but less than a maximum width portion 129 positioned between the minimum width portion 132 and the medium width portion 128. The medium width portion 128 may be sized to allow a standard sugar cube, approximately ½ inch cube though sizes vary for different manufacturers ranging from sides that are 5 mm to sides that are 8 mm (one example is roughly 5 mm×6.5 mm×8 mm), to pass through the medium width portion 128, while preventing typical sized ice cubes from passing through medium width portion 128. In some, non-limiting embodiments, a medium width portion 128 comprises a width of between approximately 20 millimeters and approximately 30 millimeters. More particularly, a medium width portion 128 may comprise a width of between approximately 24 and approximately 26 millimeters. A first reservoir 124 may comprise a height or distance between the first opening 122 and the second opening 126 of between approximately 50 millimeters and approximately 70 millimeters. More particularly, a first reservoir may comprise a height or distance between the first opening 122 and a second opening 126 of between approximately 60 millimeters and approximately 62 millimeters.

As noted above, one or more embodiments of a communication channel 130 comprise a varied width or diameter communication channel 130. In the non-limiting embodiment of a beverage receptacle depicted in FIG. 11, the communication channel comprises a bulbous shape. According to some aspects, a variable width communication channel comprises at least a minimum width portion 132 that may be aligned with the junction of the communication channel 130 and either the second opening 126 of the first reservoir 124 or the first opening 134 of the second reservoir 140. In the non-limiting embodiment depicted in FIG. 11, the minimum width portion 132 of the communication channel is positioned at a juncture of the communication channel 130 and the first opening 134 of the second reservoir 140. The minimum width portion 132 may be sized to prevent a standard size sugar from immediately falling through the minimum width portion 132 into the second reservoir 140. According to some aspects, similar to other embodiments described herein, the minimum width portion 132 may comprise a width of between approximately 5 millimeters and approximately 13 millimeters. More particularly, the minimum width portion 132 may comprise a width of between approximately 9 and approximately 11 millimeters. Even more particularly, a minimum width portion 132 may comprise a width of approximately 10 millimeters.

A communication channel 130 may further comprise a medium width portion 128 as described above and/or a maximum width portion 129. In the non-limiting embodiment depicted in FIG. 11, a maximum width portion 129 of the communication channel is positioned between a minimum width portion 132 and a medium width portion 128. In other embodiments, a maximum width portion 129 may be placed in other positions of the communication channel 130. According to some aspects, a maximum width portion 129 of a communication channel 130 comprises a diameter or width of between approximately 35 millimeters and 55 millimeters. More particularly, a maximum width portion 129 of a communication channel 130 may comprise a diameter or width of between approximately 40 millimeters and approximately 55 millimeters. Even more particularly, a maximum width portion 129 of a communication channel 130 may comprise a diameter or width of approximately 45 millimeters. According to some aspects, a height of a communication channel 130 from the first opening 134 of the second reservoir 140 to the second opening 126 of the first reservoir 124 is between approximately 30 millimeters and approximately 50 millimeters. More particularly, a height of a communication channel 130 is between approximately 35 millimeters and approximately 45 millimeters. Even more particularly, a height of a communication channel 130 is approximately 40 millimeters.

One or more embodiments of a beverage receptacle 120 comprise a second reservoir 140 comprising first opening 134 and a second opening 138. The first opening 134 and the second opening 138 may comprise any of the features, dimensions, and functions as described elsewhere in this document. In the non-limiting embodiment depicted in FIG. 11, the second reservoir 140 is substantially conical or frustoconical in shape. Other embodiment may comprise other various shapes and configurations, such as but not limited bulbs, cylinders, and the like. A second reservoir 140 may comprise a substantially flat base section 136 configured to allow the beverage receptacle 170 to stand upright on a flat surface. According to some aspects, a base section 136 comprises a width or diameter of between approximately 50 millimeters and approximately 90 millimeters. More particularly, a base section 136 may comprise a width or diameter of between approximately 60 millimeters and approximately 80 millimeters. Even more particularly, a base section may comprise a width or diameter of approximately 70 millimeters. A second reservoir 140 may comprise a height of between approximately 50 millimeters and approximately 70 millimeters. More particularly, a second reservoir may comprise a height of between approximately 55 and approximately 65 millimeters. Even more particularly, a second reservoir may comprise a height of approximately 59 millimeters.

According to some aspects, a second reservoir 140 may comprise at least one second opening 138. Although the non-limiting embodiment depicted in FIG. 11 comprises only one second opening 138 on the second reservoir 140, it is contemplated that other embodiments may comprise a plurality of second openings 138 without departing from the scope of this disclosure. The second opening 138 of the second reservoir 140 may be configured to receive an elbow 142 or a sipping pipe 150 for removably coupling. In other embodiments, either an elbow 142 or a sipping pipe 150 is integrally formed to the second reservoir 140. In the non-limiting embodiment depicted in FIG. 11, an elbow 142 is integrally formed with the second reservoir 140 such that an elbow channel 154 is in fluid communication with the second opening 138 of the second reservoir 140. A second opening may further comprise one or more dose or measurement lines on the second reservoir 140 to allow a user to know how much alcohol or other beverage to pour into the beverage receptacle.

Also contemplated as part of this disclosure is a sipping pipe 150. A sipping pipe used with a beverage receptacle 120 may comprise any sipping pipe described elsewhere in this document. In the non-limiting embodiment depicted in FIG. 11, a sipping pipe 150 is removably coupled to an elbow 142 at a first opening 144 of the elbow 142 such that a sipping channel 148 is in fluid communication with the elbow channel 154 of the elbow 142 to form a continuous channel between the open first end 152 of the sipping pipe 150 and the second opening 138 of the second reservoir 140.

When liquid is added to the beverage receptacle 120 through the first opening 122 of the first reservoir 124, especially if a liquid is already held within the second reservoir 140, the liquid level in the sipping pipe 150 has a tendency to bounce or rapidly rise and fall. The initial up and down movement of the liquid within the beverage receptacle 120 assists in providing a more thorough mixture of the emulsified liquid, to allow for a more consistent balance throughout the solution. The atmospheric pressure, then, assists in the blending process of the two liquids in the beverage receptacle. This bouncing occurs as air bubbles from the second reservoir 140 pass through the first opening 134 of the second reservoir 140 and is replaced by water from above the first opening 134 of the second reservoir 140. Thus, the liquid within the sipping pipe 150 rises and falls to as air is released and then replace with water. If the volume of the sipping channel 148 is insufficient, the liquid within the sipping pipe 150 will spill from the first open end 152 of the sipping pipe 150. Thus, the two channels of the sipping channel 148 and the communication channel 130, in combination with the choke point of the minimum diameter portion 132 allows for the components of absinth or other alcohols to more readily emulsify in a semi-controlled manner. The two channels of the sipping channel 148 and the communication channel 130 is advantageous to conventional systems because it allows and provides a more thorough mix so a user can get the same color of drink through the final product.

According to some aspects, the sipping pipe 150 is configured such that the open first end 152 of the sipping pipe 150 is positioned above the first opening 122 of the first reservoir 124 to prevent spilling during this time. The positioning of the first open end 152 may vary based on overall design of the beverage receptacle 120. According to some aspects, a sipping pipe 150 need only be higher than the first opening 122 if the volume of the sipping chamber 148 is relatively small. If the volume of the sipping channel 148 is larger, the height of the first open end 152 may not need to be higher than the first opening 122. The volume of the mixture in the beverage receptacle 120 is compensated by the allowable air pressure or volume of the sipping pipe 150. Utilizing a plurality of sipping pipes 150 may reduce the need for the open first ends 152 to be above the first opening 122 as long as there is enough volume in the plurality of sipping pipes 150 to compensate for the bouncing of liquid level within the sipping pipe 150 as liquid is added to the beverage receptacle 120 through the first opening 122 of the first reservoir 124 and air bubbles seep from the second reservoir 140 through the first opening 134 of the second reservoir.

In one or more embodiments, the sipping channel 148 of the sipping pipe 150 comprises a width or diameter substantially equal to the minimum width portion 132 of the communication channel 130. In embodiments comprising a plurality of second openings 138 on the second reservoir 140, a plurality of sipping pipes 150 and/or elbow 152 may be coupled to the plurality of second openings 138 as described elsewhere in this document. In such embodiments, a width of a sipping channel 148 may be narrower than embodiments comprising only a single sipping pipe 150.

One or more embodiments of a sipping pipe 150 comprise at least one hollow rib 146 in fluid communication with the sipping channel 148 of the sipping pipe 150. In the non-limiting embodiment depicted in FIG. 11, a sipping pipe 150 comprises three hollow ribs 146 each in fluid communication with the sipping channel 148. The hollow ribs 146 may comprise annular, outward grooves on an inner surface of the sipping channel 148. According to some aspects, the hollow ribs 146 are configured to provide for additional volume within the sipping channel 148 without having to increase the overall diameter of the entire sipping channel 148. Additional hollow ribs 146 let more air into the sipping pipe 150 for a faster mixture.

Also contemplated is a method of preparing and louching an alcoholic beverage. Although reference is made to a beverage receptacle 120, it is contemplated that such methods may be utilized with any other beverage receptacles disclosed herein without departing from the scope of this disclosure. According to some aspects, an alcohol such as but not limited to absinthe is poured into a beverage receptacle 120. The alcohol may be poured in to the beverage receptacle 120 through the first opening 122 of the first reservoir until the alcohol reaches the dose line in the second reservoir 140.

A method of preparing and louching an alcoholic beverage may further comprise inserting sugar, such as a sugar cube, through the first opening 122 of the first reservoir 124. According to some aspects, a sugar cube is sized to fall through the first opening 122 and second opening of the first reservoir, but be stopped from falling into the second reservoir 140 by the minimum width portion 132 of the communication channel 130. A method of preparing and louching an alcoholic beverage may further comprise inserting ice through the first opening 122 of the first reservoir 124. The ice may be sized such that the second opening 126 or the medium width portion 128 of the communication channel prevent the ice from falling into the communication channel 130.

A method may further comprise pouring cold water or other liquid into the beverage receptacle 120 through the first opening 122 of the first reservoir 124. According to some aspects, approximately 4 to approximately 5 parts of water are added for every part of absinthe or other alcohol previously added. As the ice cold water seeps past the sugar cube that partially dams the first opening 134 of the second reservoir, louching of the absinth or other alcohol begins. When louching is completed, a method may further comprise briefly blowing into the sipping pipe 150 to finalize the mixing of the alcohol and the water. Various embodiments disclosed herein create a more aesthetically pleasing ouzo effect through the process of louching. The overall configuration of beverage receptacles enhances the Maragoni effect and allows a novice the ability to replicate the louching at will.

Figures 8, 9:
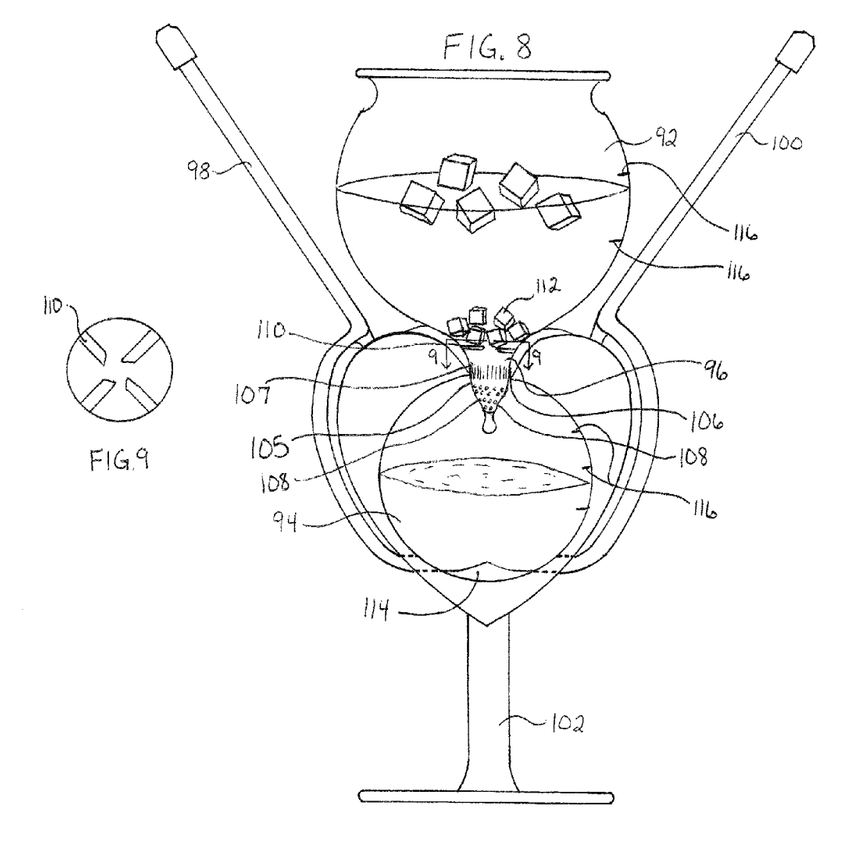
FIG. 8 is a perspective view of a sixth implementation of a beverage receptacle.
FIG. 9 is a cross-sectional view of a portion of FIG. 8 taken along cross-section lines 9-9.

FIG. 8 illustrates another particular implementation of a beverage receptacle comprising a first reservoir 92, a second reservoir 94, a communication channel 96, a first side sipping pipe 98, a second side sipping pipe 100, and a base with stem 102. Similar to the first implementation illustrated by FIG. 2, the communication channel 96 in this particular implementation may have a generally consistent diameter between a second opening in the first reservoir 104 and a first opening in the second reservoir 106. The minimum diameter feature of the communication channel 96 for this particular implementation, as described above with reference to FIG. 1, may be located at the juncture between the communication channel 96 and the first opening in the second reservoir 106 or elsewhere along the communication channel 106. The base section 102 with this particular implementation includes both a narrow stem extending vertically from the second reservoir and a bottom surface that is planar and configured to rest stably on a flat surface so that the base with stem 102 can support the beverage receptacle on a flat, horizontal surface. This particular implementation also incorporates an artistic design that generally represents a heart with the second reservoir 94 as the center of the heart.

Particular implementations may comprise second reservoirs with alternate shapes, as illustrated by FIG. 8. The variety of possible alternate shapes for a second reservoir are endless, but particular implementations are specifically contemplated, without limitation, to be in a bulbous, teardrop, oval, or other similar shape that enhances viewing of the louching reaction as it occurs in a second reservoir.

Various implementations of beverage receptacles may comprise components formed integrally as a unitary piece or separately and assembled together. For example, in a particular implementation of a beverage receptacle, at least a portion of a first reservoir, a second reservoir, and a communication channel are integrally formed as a unitary piece. Another particular implementation may include attachable and/or interchangeable components. For example, a first reservoir may be joined to a communication channel with interlocking threads, a friction fitting, or other coupling technique as found in the applicable art. By configuring the first and second reservoir as separatable from each other, the various components may be more easily manufactured and will be more easily cleaned. Using a nipple between the first and second reservoirs, whether the nipple comprises one hole or a plurality of holes, allows the first opening in the second reservoir to be made larger to simplify sanitation of the second reservoir. With separatable reservoirs, the first and/or second reservoirs may be changed to designs which celebrate particular occasions, holidays, seasons, etc.

By non-limiting example of a seasonal aspect, FIG. 8 provides an example of an implementation appropriate for Valentine's Day. In another aspect illustrated by FIG. 8, the first reservoir 92 is fixedly coupled to the communication channel 96 and removably coupled to the second reservoir 94 at the first opening 106 to the second reservoir 94. The communication channel 96 comprises a friction fit nipple 105 that fits into a fitting 107 on the second reservoir 94. One technique commonly used in glass-on-glass arrangements is that a first glass nipple is sanded slightly before placing the nipple into a second glass fitting that has been slightly sanded. The resulting coupling of the two glass pieces is an airtight coupling resistant to decoupling.

In this particular implementation, though this aspect could similarly be applied to any of the other implementations described in this disclosure, the communication channel may comprise a plurality of small holes 108 in the nipple 105 between the first reservoir 92 and the second reservoir 94. The plurality of small holes 108 may be of any size and shape. However, holes comprising a minimum dimension smaller than 5 millimeters are contemplated, and in particular implementations holes comprising a minimum dimension smaller than 1 millimeter are considered desirable to better regulate the drip into the second reservoir. The communication channel 96, thus, comprises a minimum dimension configured to cause liquid passing through it to drip into the social beverage in the second reservoir 94 to assist in louching the social beverage. Although the nipple here is shown with a rounded shape, it is specifically contemplated that the nipple shape could be made fanciful for particular implementations to further ornament the beverage receptacle. By non-limiting example, the Valentines implementation of FIG. 8 may be ornamented with a nipple in the shape of a heart or a cupid with one or more holes in various portions of the hart or cupid to add to the ornate decoration.

Another aspect of the particular implementation of a beverage receptacle illustrated in FIG. 8 and cross-section 9-9 shown in FIG. 9 is the provision of a grate 110 comprising a plurality of support fingers at or near the second end of the first reservoir 92. In use, sugar cubes 112 may be placed in the first reservoir 92 and be permitted to sink to the bottom of the first reservoir 92 without plugging the communication channel 96. The sugar cubes 112 may rest upon the grate 110 instead of the bottom of the reservoir 92. Although the grate 110 is shown here with fingers that do not meet each other, configurations where the fingers meet or extend fully across the opening, and other configurations of a grate are contemplated to support solid sweetener above the minimum dimension portion of the communication channel. The grate may be molded using conventional molding techniques, or blown in heated glass using conventional glass blowing techniques.

Another aspect of the implementation shown in FIG. 8 is the provision of a liquid guide 114 at the bottom of the second reservoir 94 adjacent the second openings to the second reservoir 94. The liquid guide 114 is a raised portion of the bottom of the second reservoir 94 that ensures that there is no portion of the bottom of the second reservoir 94 that is below the second openings to the second reservoir 94 so that all of the liquid will have the ability to reach the second openings. Although this aspect is illustrated with regard to a sipping pipe example of a beverage receptacle, this aspect is also specifically contemplated for use with faucet implementations.

Particular implementations of a beverage receptacle may further comprise volume indicator marks 116 on a side of the first and/or second reservoirs. For example, a bar tender or other user, could quickly see from a volume indicator mark 116 on a side of the beverage receptacle where a 1 shot or 2 shot or even a 4 or more shot serving is for that receptacle. This may significantly reduce the amount of excess alcohol being served and save money for the bar. Additionally, this aspect is particularly advantageous for louched and other mixed social beverages because an ideal mix of the various liquids can ensure a better tasting beverage. By indicating how much of a first beverage to place in the second receptacle and also placing the first receptacle above the second receptacle with an indication of how much of a second beverage to place in the first receptacle, the bar tender or other user can obtain an ideal mix of the beverages with reference to the marks on the receptacle.

The following are several non-limiting examples of specific measurements that could be indicated on a beverage receptacle in the United States to obtain a proper mix of absinthe and cold water as a social beverage. It has been determined that a proper mix of absinthe and cold water is 1.5 oz ("1 shot") of absinthe to 4 oz of water. A bottle of absinthe typically holds 750 ml or 25.36 oz which equals 17 shots of absinthe. In an implementation of a beverage receptacle for a full bottle of absinthe (likely having four faucets), the second (lower) reservoir may be configured to have a volume of at least 94 oz and have an indicator mark on the second reservoir to indicate 17 shots of absinthe. The first (upper) reservoir may then be configured to have a volume of at least 70 oz and have an indicator mark on the first reservoir to indicate 68 oz of water. The same receptacle may also comprise indicator marks on the second reservoir for a half bottle of absinthe (12.8 oz) and for a quarter bottle (6.34 oz), and indicator marks on the first reservoir for 34 oz of water and for 17 oz of water. Alternatively, smaller beverage receptacles may be configured, for example, a first (upper) reservoir of at least 32 oz and a second (lower) reservoir of at least 44 oz will allow space sufficient for 2 shots per person for 4 people.

The particular implementations of a beverage receptacle disclosed may be formed of any of many different types of materials or combinations that can readily be formed into shaped objects and are consistent with the intended operation of a beverage receptacle. For example, some or all of the various components of a beverage receptacle may be made in whole or in part of blown, shaped glass. The blown, shaped glass may be clear or may incorporate both solid and patterned color schemes. Alternately, some or all of the various components of a beverage receptacle may be made in whole or in part of a plastic material. The plastic material may also be clear or may incorporate both solid and patterned color schemes.

Furthermore, a first reservoir, second reservoir, communication channel, base section, sipping pipe, and/or faucet and any other components used or needed in forming a particular implementation of a beverage receptacle may be manufactured separately and then assembled together, or any or all of the components may be manufactured simultaneously and integrally joined with one another using manufacturing techniques known to those of ordinary skill in the art. Manufacture of the beverage receptacle components may involve glass blowing, casting, vacuum forming, injection molding, and/or the like. If any of the components are manufactured separately, they may then be coupled or removably coupled with one another in any manner, such as with fittings, fasteners, adhesives, sonic or heat welding and/or the like, and depending upon, among other considerations, the particular material(s) used in forming the components of the beverage receptacle.

The slow addition of a liquid to certain social beverages, such as absinthe, is one way to louche a social beverage. In particular implementations of a beverage receptacle configured according to the principles disclosed herein, when a social beverage is added to a first reservoir, it flows at a steady rate from the first reservoir, through a communication channel, and into a second reservoir. The social beverage flows through the communication channel freely due to an open airway through a sipping pipe or a fountain that facilitates the necessary air displacement. After the social beverage is added to the second reservoir and the airway is blocked by the beverage, gasses are released from the social beverage due to a concentration of alcohol. The gas build-up within the second reservoir hinders the flow of additional liquid through the communication channel, and the additional liquid drips rather than pours into the second reservoir due to both the optimal minimum diameter discussed above and the contravening gasses.

Particular implementations designed for use with absinthe may comprise a mixing ratio of approximately 120 milliliters of water to 45 milliliters of absinthe for a single serving, and serving the unlouched beverage in a beverage receptacle having appropriate dimensions such that the second reservoir is at least 165 milliliters and the first reservoir is at least 120 milliliters. Other particular implementations suitable for preparing multiple servings of louched absinthe may comprise a similar ratio of water to absinthe, but the multiple beverage receptacle is configured with much larger volumes multiplied by the number of servings to be prepared within the multiple beverage receptacle. For example, particular social beverage bottles, such as that for absinthe, contain approximately 750 milliliters of alcoholic beverage. A particular implementation of a multiple beverage louching receptacle is configured such that the second receptacle comprises a volume of at least 1000 milliliters and the first receptacle comprises a volume of at least 2500 milliliters so that the multiple beverage receptacle is sized to louche a full bottle of a social beverage with an appropriate amount of water.

Figure 10:
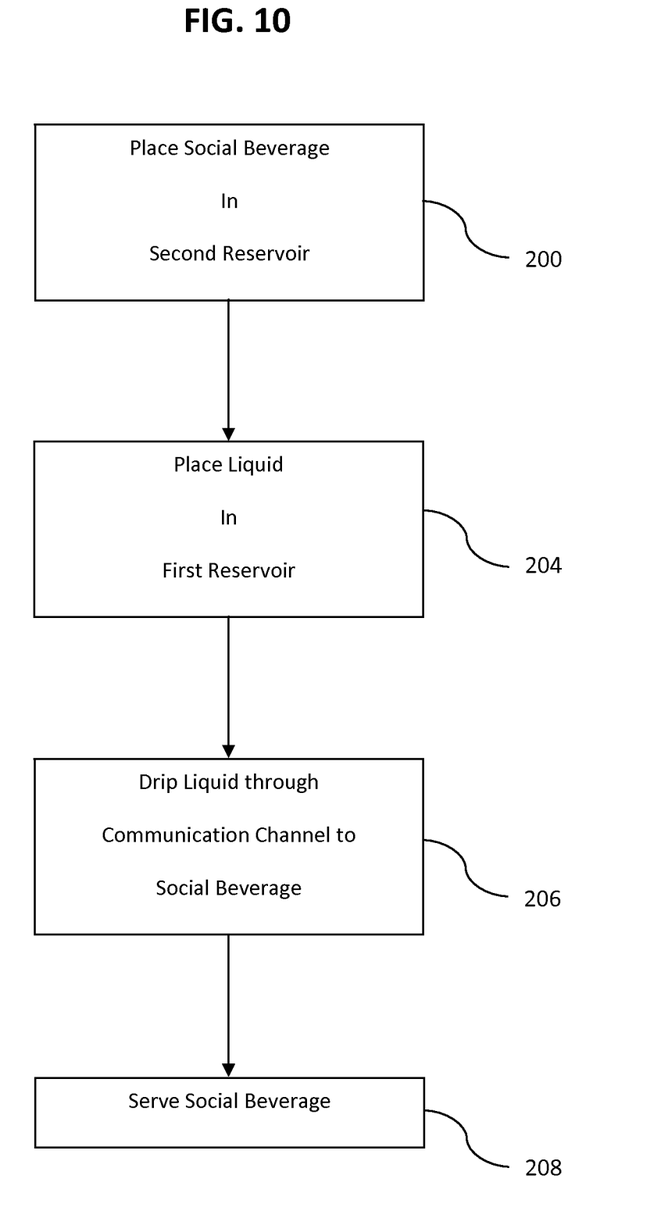
FIG. 10 is a flowchart illustrating a method of using a beverage receptacle.

Referring to FIGS. 1 and 10, a social beverage may be mixed, and in some cases louched, using three general steps. First, place a social beverage in the second reservoir 6 (Step 200). Second, place a liquid, such as cold water, into the first reservoir 4 (Step 202). Third, drip the liquid through the communication channel 8 and into the social beverage (Step 204). After the social beverage is mixed, it may be served (Step 206).

With the particular implementation illustrated by FIG. 1, serving the social beverage is achieved with the sipping pipe 16. A drinker of the social beverage may drink the social beverage through the sipping pipe 16 as the social drinker carries the social beverage (which may still be continuing its louching process as the beverage receptacle is carried). Similarly, the particular implementation of FIG. 8 comprises a first side sipping pipe 98 and a second side sipping pipe 100, so serving the social beverage may be achieved with one or both of the sipping pipes 98, 100. Other particular implementations may include more than two sipping pipes.

Alternately, FIG. 5 illustrates a particular implementation where serving the social beverage may be achieved through the faucet 56 into a beverage receptacle of any configuration. FIG. 7 illustrates an alternate implementation where serving the social beverage may be achieved using the first side faucet 84, the second side faucet 86, or both. Other particular implementations may comprise more than two faucets.

Particular implementations with faucets may be comprised of larger second reservoirs than particular implementations comprising sipping straws. Implementations with faucets are better suited for preparing and dispensing multiple servings as illustrated in FIG. 7. A glass or other beverage receptacle may be positioned below the first side faucet 84 and/or second side faucet 86 for serving a louched social beverage. Other particular implementations may incorporate more than two faucets. Particular implementations with faucets and larger second reservoirs may be used in central locations for filling multiple serving glasses through a faucet or faucets.

Particular implementations may comprise faucets that are fixedly coupled to a second opening of a second reservoir by adhesive, heat welding or other known method. Alternatively, other implementations may comprise detachable faucets and coupling mechanisms as found in the applicable art for creating an airtight and watertight coupling between the faucets and a second reservoir.

Another optional but generally included ingredient in a social beverage louching process is a sweetener. A sweetener may be added to a first reservoir prior to adding cold water. It is contemplated that generally a sweetener would be added with ice in the first reservoir so that the sweetener does not flow or drop directly into a communication channel or a second reservoir. A sweetener may be sugar or a non-sugar substitute, and may be in cubed, granular or liquid form when added to the first reservoir 4.

A particular implementation may comprise a grate positioned within a first reservoir for holding cubed sugar above a communication channel. The grate may comprise glass, plastic, metal or other suitable material as discussed above. The grate may have gaps or perforations that are narrow enough to support a sugar cube, but large enough to allow liquids to flow freely through the grate. It is contemplated that in most situations, serving a social beverage using sugar cubes will comprise placement of the sugar cubes within the first reservoir before water is placed in it. The heavier sugar cubes will likely sink to the bottom of the first reservoir near the communication channel so that all of the water that passes into the communication channel also passes by the sugar cubes.

In places where the description above refers to particular implementations of a beverage receptacle, it should be readily apparent that a number of modifications may be made without departing from the spirit thereof and that these implementations may be applied to other beverage receptacles. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein. Further implementations are within the following claims.

The invention claimed is:

1. An alcohol louching receptacle system, comprising:
   a first reservoir comprising a first opening and a second opening, the first opening being sized to receive ice and a liquid therethrough and the second opening being sized smaller than the first opening;
   a second reservoir comprising a first opening and a second opening;
   a communication channel extending between the second opening of the first reservoir and the first opening of the second reservoir, the communication channel being variable in width, wherein a portion of the communication channel comprises a minimum width portion comprising a width of between 5 millimeters and 13 millimeters;
   the system further comprising a first width portion positioned proximate the first opening of the first reservoir and a second width portion smaller than the first width portion and larger than the minimum width portion, the second width portion positioned proximate the second opening of the first reservoir.

2. The alcohol louching receptacle system of claim 1, further comprising a sipping pipe coupled to the second opening of the second reservoir, the sipping pipe comprising a second channel extending from an open first end to the second opening of the second reservoir.

3. The alcohol louching receptacle system of claim 2, wherein the sipping pipe further comprises one or more hollow ribs extending outward from and in fluid communication with the channel of the sipping pipe.

4. The alcohol louching receptacle system of claim 1, wherein the communication channel is variable in width and the portion of the communication channel comprising the width of between 5 millimeters and 13 millimeters is positioned proximate the first opening of the second reservoir, and wherein the first opening of the first reservoir comprises a width of between 40 and 55 mm.

5. The alcohol louching receptacle system of claim 4, wherein the portion of the communication channel comprising the width of between 5 millimeters and 13 millimeters is a minimum width portion of the communication channel comprising a width of between 9 mm and 11 mm, and the communication channel further comprises a medium width portion positioned proximate the second opening of the first reservoir and comprising a width of between 20 mm and 30 mm.

6. The alcohol louching receptacle system of claim 5, wherein the beverage louching receptacle system further comprises at least one sugar cube sized larger than the minimum width portion and one or more ice cubes.

7. The alcohol louching receptacle system of claim 6, further comprising a faucet operably coupled to the second opening of the second reservoir.

8. The alcohol louching receptacle system of claim 1, further comprising a valve positioned within the communication channel and configured to increase and decrease a cross-section dimension of the communication channel.

9. The alcohol louching receptacle system of claim 1, wherein the portion of the communication channel comprising the width of between 5 millimeters and 13 millimeters comprises a width of between 5 millimeters and 5.7 millimeters.

10. The alcohol louching receptacle system of claim 1, wherein the communication channel further comprises a bulbous shape.

11. An alcohol louching receptacle, comprising:
    a first reservoir comprising a first opening and a second opening;
    a second reservoir comprising a first opening and a second opening;
    a first channel extending between the second opening of the first reservoir and the first opening of the second reservoir and being variable in width and having a minimum width portion comprising a width of between 5 millimeters and 13 millimeters;
    at least one second channel extending from the second opening of the second reservoir to an open first end of the second channel positioned on an opposite side of the first opening of the first reservoir relative to the second opening of the second reservoir;
    the receptacle further comprising a first width portion positioned proximate the first opening of the first reservoir and a second width portion smaller than the first width portion and larger than the minimum width portion, the second width portion positioned proximate the second opening of the first reservoir.

12. The alcohol louching receptacle of claim 11, wherein a portion of the at least one second channel comprises a width substantially equal to the minimum width portion of the first channel.

13. The alcohol louching receptacle of claim 11, wherein the second channel is positioned within a sipping pipe and further comprises one or more hollow ribs in fluid communication with the second channel and oriented parallel to a bottom surface of the receptacle.

14. The alcohol louching receptacle of claim 11, wherein the communication channel further comprises a bulbous shape.

15. An alcohol louching receptacle, comprising:
a first reservoir comprising a first opening;
a second reservoir comprising a second opening;
a communication channel configured to allow fluid communication between the first reservoir and the second reservoir, wherein a portion of the communication channel comprises a minimum width of between 5 millimeters and 13 millimeters and is positioned proximate the second reservoir; the communication channel further comprising a medium width portion proximate the first reservoir comprising a width of between 20 and 30 millimeters, and a maximum width portion comprising a width of between 40 and 50 millimeters positioned between the minimum width portion and the maximum width portion; and
a sipping pipe coupled to the second opening of the second reservoir, the sipping pipe comprising a second channel extending from an open first end to the second opening of the second reservoir.

16. The alcohol receptacle of claim 15, wherein the sipping pipe further comprises one or more hollow ribs extending outward from and in fluid communication with the channel of the sipping pipe.

17. The alcohol receptacle of claim 15, wherein the minimum width portion comprises a width of between 8 millimeters and 12 millimeters.

18. The alcohol receptacle of claim 15, wherein the portion of the communication channel comprising the width of between 5 millimeters and 13 millimeters comprises a width of between 5 millimeters and 5.7 millimeters.

19. The alcohol receptacle of claim 15, wherein the communication channel further comprises a bulbous shape.

* * * * *